(12) United States Patent
Okamoto et al.

(10) Patent No.: US 9,206,314 B2
(45) Date of Patent: Dec. 8, 2015

(54) RESIN COMPOSITION AND MOLDED ARTICLE THEREOF

(71) Applicants: TEIJIN LIMITED, Osaka (JP); KANEKA CORPORATION, Osaka (JP)

(72) Inventors: Hiroshi Okamoto, Tokyo (JP); Toyohisa Fujimoto, Hyogo (JP)

(73) Assignees: TEIJIN LIMITED, Osaka (JP); KANEKA CORPORATION, Osaka (JP)

( * ) Notice: Subject to any disclaimer, the term of this patent is extended or adjusted under 35 U.S.C. 154(b) by 0 days.

(21) Appl. No.: 14/418,206

(22) PCT Filed: Jul. 31, 2013

(86) PCT No.: PCT/JP2013/071293
§ 371 (c)(1),
(2) Date: Jan. 29, 2015

(87) PCT Pub. No.: WO2014/021475
PCT Pub. Date: Feb. 6, 2014

(65) Prior Publication Data
US 2015/0218369 A1    Aug. 6, 2015

(30) Foreign Application Priority Data

Jul. 31, 2012  (JP) ................. 2012-169363

(51) Int. Cl.
| | | |
|---|---|---|
| C08L 69/00 | (2006.01) | |
| C08L 51/04 | (2006.01) | |
| C08F 265/02 | (2006.01) | |
| C08F 265/06 | (2006.01) | |
| C08F 279/02 | (2006.01) | |

(52) U.S. Cl.
CPC ............. *C08L 69/00* (2013.01); *C08F 279/02* (2013.01); *C08L 2201/02* (2013.01); *C08L 2201/10* (2013.01); *C08L 2207/53* (2013.01)

(58) Field of Classification Search
CPC ..... C08L 51/04; C08L 69/00; C08L 2207/53; C08F 279/02; C08F 265/02; C08F 265/06
USPC ....................................... 525/186
See application file for complete search history.

(56) References Cited

U.S. PATENT DOCUMENTS

| | | | | |
|---|---|---|---|---|
| 7,067,930 | B2 * | 6/2006 | Sumita et al. ............. | 257/792 |
| 2006/0149024 | A1 | 7/2006 | Ono et al. | |
| 2008/0108754 | A1 | 5/2008 | Hayata et al. | |
| 2010/0160563 | A1 | 6/2010 | Miyake et al. | |
| 2013/0131271 | A1 | 5/2013 | Yokogi et al. | |
| 2014/0031493 | A1 | 1/2014 | Sasaki et al. | |

FOREIGN PATENT DOCUMENTS

| | | |
|---|---|---|
| GB | 1079686 | 8/1967 |
| JP | 2007-70438 | 3/2007 |
| JP | 2011-132316 | 7/2011 |
| JP | 2012-1683 | 1/2012 |
| WO | 2004/111106 | 12/2004 |
| WO | 2007/013463 | 2/2007 |
| WO | 2008/146719 | 12/2008 |
| WO | 2012/008344 | 1/2012 |
| WO | 2012/132493 | 10/2012 |

OTHER PUBLICATIONS

International Search Report issued Oct. 22, 2013 in International (PCT) Application No. PCT/JP2013/071293.
English translation of International Preliminary Report on Patentability and Written Opinion issued Feb. 12, 2015 in PCT/JP2013/071293.
European Search Report issued Jul. 13, 2015 in European Application No. 13825246.5.

* cited by examiner

*Primary Examiner* — Fred M Teskin
(74) *Attorney, Agent, or Firm* — Wenderoth, Lind & Ponack, L.L.P.

(57) ABSTRACT

A polycarbonate resin composition which has a high biogenic matter content, is excellent in transparency, surface hardness and impact resistance and is useful as an industrial material having excellent moldability. The resin composition contains 100 parts by weight of a polycarbonate (component A) containing not less than 30 mol % of a recurring unit represented by the following formula (1) and 2 to 20 parts by weight of an impact resistance modifier (component B), wherein the resin composition has an aggregation structure that impact resistance modifier (component B) domains are dispersed in the matrix of the polycarbonate (component A), the average size of the impact resistance modifier domains is 5 to 200 nm, and the normalized dispersity is not more than 17%

(1)

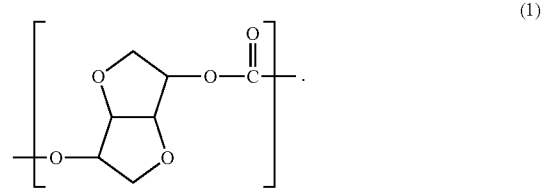

8 Claims, No Drawings

RESIN COMPOSITION AND MOLDED ARTICLE THEREOF

TECHNICAL FIELD

The present invention relates to a resin composition comprising a polycarbonate and to a molded article thereof. More specifically, it relates to a resin composition comprising a polycarbonate derived from sugar which is a biogenic matter and has excellent impact resistance, desirably improved impact resistance at a low temperature while it retains transparency and heat resistance and to a molded article thereof.

BACKGROUND ART

Polycarbonates are polymers in which aromatic or aliphatic dioxy compounds are connected to each other by a carbonate ester, and a polycarbonate obtained from 2,2-bis(4-hydroxyphenyl)propane (commonly known as bisphenol A) out of these is used in many fields as it is excellent in not only transparency and heat resistance but also mechanical properties such as impact resistance.

Polycarbonates are generally produced from raw materials obtained from oil resources. Since the depletion of oil resources is now concerned, a polycarbonate obtained by using an ether diol produced from sugar which is a biogenic matter is now under study.

For example, Patent Document 1 proposes a homopolycarbonate having a melting point of 203° C., which is produced by using a melt transesterification process. Patent Document 2 proposes a polycarbonate having a glass transition temperature of 170° C. or higher, which is produced by using a tin catalyst. Patent Document 3 proposes a copolycarbonate of isosorbide and a linear aliphatic diol.

When the development of the industrial application of these polycarbonates comprising isosorbide is taken into consideration, impact resistance must be improved. For example, the ISO179 notched Charpy impact strength of isosorbide homopolycarbonate having a specific viscosity of 0.33 is about 6 kJ/m². This value is unsatisfactory for industrial application and must be improved.

In general, impact resistance greatly depends on the molecular weight (=specific viscosity) of a resin. Therefore, to improve impact resistance, the molecular weight of the resin must be increased. The isosorbide polycarbonate described in the above Patent Documents 1 and 2 has a problem that molding becomes difficult as the melt viscosity of the resin becomes too high when the molecular weight is increased. As for the polycarbonate of Patent Document 3, the ISO179 notched Charpy impact strength of the polycarbonate having a reduced viscosity of about 0.9 of Example 6 is about 7 kJ/m². This value is unsatisfactory for industrial application and must be improved.

Patent Document 4 proposes a resin composition prepared by adding an addition polymerization polymer such as ABS resin to isosorbide polycarbonate. However, when ABS resin is added, impact resistance is improved but the heat resistance and transparency of the polycarbonate greatly deteriorate.

Patent Document 5 proposes a resin composition which has improved impact resistance, low melt viscosity and excellent heat resistance, heat stability and moldability, which is obtained by adding a rubbery polymer to a polycarbonate derived from an ether diol such as isosorbide. However, Patent Document 5 is silent about transparency.

Patent Document 6 discloses a method of providing impact resistance without impairing the transparency of the isosorbide polycarbonate by adding core-shell rubber to isosorbide polycarbonate. However, since the haze of the obtained molded article is high, it cannot be said that transparency is satisfactory for molded articles for optical use which require extremely high transparency. Further, the above Patent Document 6 discloses a resin composition having transparency, impact resistance and heat resistance, which is prepared by finely dispersing a soft styrene-based resin having an average refractive index difference of ±0.015 or less into isosorbide polycarbonate. However, a molded article of the obtained resin composition is a 0.1 mm-thick film, and a method of improving the impact resistance of a large-sized molded product obtained by injection molding or extrusion molding while retaining its transparency is not disclosed.

(Patent Document 1) British Patent Application No. 1079686
(Patent Document 2) WO2007/013463
(Patent Document 3) WO2004/111106
(Patent Document 4) JP-A 2007-070438
(Patent Document 5) WO2008/146719
(Patent Document 6) WO2012/008344

DISCLOSURE OF THE INVENTION

It is an object of the present invention to provide a resin composition which is excellent in transparency, surface hardness and impact resistance and desirably has improved impact resistance at a low temperature.

The inventors of the present invention found that a composition comprising a polycarbonate derived from an ether diol such as isosorbide and an impact resistance modifier forming a specific aggregation structure has high transparency, high surface hardness and excellent impact resistance at a low temperature. The present invention was accomplished based on this finding. According to the present invention, the above object is attained by the following invention.

1. A resin composition comprising 100 parts by weight of a polycarbonate (component A) containing not less than 30 mol % of a recurring unit represented by the following formula (1) and 2 to 20 parts by weight of an impact resistance modifier (component B) and having an aggregation structure that impact resistance modifier (component B) domains are dispersed in the matrix of the polycarbonate (component A), wherein the average size of the impact resistance modifier (component B) domains is 5 to 200 nm and the normalized dispersity is not more than 17%.

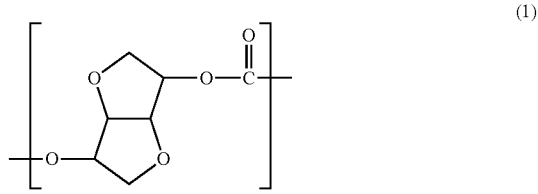

(1)

2. The resin composition in the paragraph 1, wherein the impact resistance modifier (component B) satisfies the following conditions (a) to (d):
(a) the impact resistance modifier is a core-shell type polymer;
(b) the core is composed of a rubbery polymer of a vinyl-based monomer or a rubbery polymer of a diene-based monomer and a vinyl-based monomer, wherein the vinyl-based monomer is at least one selected from (meth)acrylic acid monomers and (meth)acrylic acid alkyl ester monomers;

(c) the shell is composed of a polymer of at least one vinyl-based monomer; and
(d) the average particle diameter of the core-shell type polymer is 10 to 500 nm.

3. The resin composition in the above paragraph 1, wherein the refractive index of the impact resistance modifier (component B) is 1.490 to 1.510, and the difference between it and the refractive index of the polycarbonate (component A) is not more than 0.010.

4. The resin composition in the above paragraph 2, wherein the glass transition temperature of the core of the impact resistance modifier (component B) is 0° C. or lower.

5. The resin composition in the above paragraph 1, wherein the polycarbonate (component A) contains a structural unit derived from an aliphatic dihydroxy compound and has a melt viscosity measured by a capillary rheometer at 240° C. of $0.01 \times 10^3$ to $1.10 \times 10^3$ Pa·s at a shear rate of 6,080 sec$^{-1}$ and a glass transition temperature (Tg) of 60 to 165° C.

6. The resin composition in the above paragraph 1, wherein the total light transmittance of a molded plate thereof having a thickness is 3 mm is not less than 88%.

7. The resin composition in the above paragraph 1, wherein the haze of a molded plate thereof having a thickness of 3 mm is not more than 10%.

8. A molded article formed from the resin composition of the above paragraph 1.

9. An impact resistance modifier for polycarbonates which comprises not less than 30 mol % of a recurring unit represented by the following formula (1) and satisfies the following conditions (a) to (d):
(a) the impact resistance modifier is a core-shell type polymer;
(b) the core is composed of a rubbery polymer of a vinyl-based monomer or a rubbery polymer of a diene-based monomer and a vinyl-based monomer, wherein the vinyl-based monomer is at least one selected from (meth)acrylic acid monomers and (meth)acrylic acid alkyl ester monomers;
(c) the shell is composed of a polymer of at least one vinyl-based monomer; and
(d) the average particle diameter of the core-shell type polymer is 10 to 500 nm.

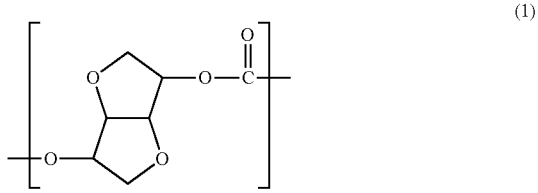

(1)

BEST MODE FOR CARRYING OUT THE INVENTION

Each of the components of the resin composition of the present invention and the mixing ratio and preparation methods of these components will be described sequentially hereinbelow.

<Component A: Polycarbonate>

The polycarbonate (component A) contains a recurring unit represented by the following formula (1) as the main constituent. The content of the recurring unit represented by the formula (1) is not less than 30 mol %, preferably not less than 40 mol %, more preferably not less than 45 mol %, much more preferably not less than 50 mol %. The upper limit of the content of the recurring unit represented by the formula (1) is preferably 100 mol %, more preferably 80 mol %.

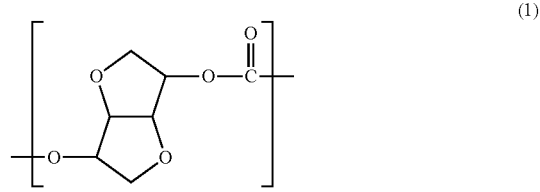

(1)

The recurring unit represented by the formula (1) is preferably a recurring unit derived from isosorbide (1,4:3,6-dianhydro-D-sorbitol).

The polycarbonate (component A) may contain another recurring unit except for the recurring unit represented by the formula (1). Examples of the other recurring unit include a unit constituted by at least one diol residue selected from the group consisting of aliphatic dial residue, alicyclic diol residue, oxylene glycol residue and diol residue having a cyclic ether structure and a unit constituted by a bisphenol residue.

At least one dial constituting the other recurring unit, selected from the group consisting of aliphatic diol, alicyclic dial, oxylene glycol and diol having a cyclic ether structure, has a boiling point under normal pressure (100 kPa) of preferably 190° C. or higher, more preferably 200° C. or higher, much more preferably 210° C. or higher. When the boiling point is lower than 190° C., an unreacted diol tends to be distilled off to the outside of the system in the latter stage of a polymerization reaction, thereby making it impossible to control the composition ratio of a copolycarbonate accurately.

Further, since the above recurring unit can provide flowability with a small amount, the unit is preferably a unit constituted by an aliphatic diol residue having 2 to 44 carbon atoms.

The aliphatic dial residue constituting the above recurring unit is more preferably at least one aliphatic diol residue selected from the group consisting of ethylene diol residue, 1,3-propanediol residue, 1,4-butanediol residue, 1,5-pentanediol residue, 1,6-hexanediol residue, 1,8-octanediol residue, 1,9-nonanediol residue and 1,10-decanediol residue.

When the boiling point of the aliphatic dial is too low, the aliphatic dial is easily distilled off during polymerization, thereby making it difficult to control the molar ratio of the polycarbonate copolymer. When the aliphatic diol has a long chain, the raw material is difficult to be acquired and expensive. Therefore, the other recurring unit is particularly preferably selected from 1,3-propanediol residue, 1,4-butanediol residue, 1,5-pentanediol residue and 1,6-hexanediol residue.

These aliphatic diols may be used alone or in combination of two or more.

Although the alicyclic diol constituting the above recurring unit is not particularly limited, a compound containing a 5-membered ring structure or 6-membered ring structure is generally used. The 6-membered ring structure may be fixed in a chair-like or boat-like form by covalent bonding.

The alicyclic diol residue constituting the above recurring unit is, for example, an alicyclic diol residue represented by the following general formula (2-1) or (2-2).

(2-1)

(2-2)

(In the formulas (2-1) and (2-2), $R^1$ and $R^2$ are each a cycloalkyl group having 4 to 20 carbon atoms or cycloalkoxyl group having 6 to 20 carbon atoms.)

Examples of the recurring unit represented by the above general formula (2-1) include 1,2-cyclohexanedimethanol residue, 1,3-cyclohexanedimethanol residue, 1,4-cyclohexanedimethanol residue, tricyclodecanedimethanol residue, pentacyclodecanepentadimethanol residue, 2,6-decalindimethanol residue, 1,5-decalindimethanol residue, 2,3-decalindimethanol residue, 2,3-norbornanedimethanol residue, 2,5-norbornanedimethanol residue and 1,3-adamantanedimethanol residue.

Examples of the recurring unit represented by the above general formula (2-2) include 1,2-cyclohexanediol residue, 1,3-cyclohexanediol residue, 1,4-cyclohexanediol residue, tricyclodecanediol residue, pentacyclodecanediol residue, 2,6-decalindiol residue, 1,5-decalindiol residue, 2,3-decalindiol residue, 2,3-norbornanediol residue, 2,5-norbornanediol residue and 1,3-adamantanediol residue.

Further, since the above recurring unit can provide flowability with a small amount, it is preferably an alicyclic diol residue represented by the above general formula (2-1).

These alicyclic diols may be used alone or in combination of two or more.

Examples of the oxyalkylene glycol constituting the recurring unit include diethylene glycol, triethylene glycol, tetraethylene glycol and polyethylene glycol.

Examples of the diol having a cyclic ether structure constituting the recurring unit include spiroglycol and dioxane glycol.

The content of the other recurring unit is not more than 70 mol %, preferably not more than 60 mol %, more preferably not more than 55 mol %, much more preferably not more than 50 mol % based on the total of all the recurring units.
(Terminal Group)

The polycarbonate (component A) may contain a terminal group represented by the following formula (3) or (4).

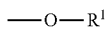
(3)

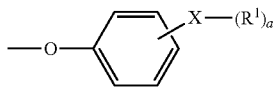
(4)

In the formulas (3) and (4), $R^1$ is an alkyl group having 4 to 30 carbon atoms, aralkyl group having 7 to 30 carbon atoms, perfluoroalkyl group having 4 to 30 carbon atoms or group represented by the following formula (5).

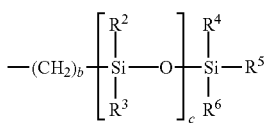
(5)

The number of carbon atoms of the alkyl group represented by $R^1$ is preferably 4 to 22, more preferably 8 to 22. Examples of the alkyl group include hexyl group, octyl group, nonyl group, decyl group, undecyl group, dodecyl group, pentadecyl group, hexadecyl group and octadecyl group.

The number of carbon atoms of the aralkyl group represented by $R^1$ is preferably 8 to 20, more preferably 10 to 20. Examples of the aralkyl group include benzyl group, phenethyl group, methylbenzyl group, 2-phenylpropan-2-yl group and diphenylmethyl group.

The number of carbon atoms of the perfluoroalkyl group represented by $R^1$ is preferably 2 to 20. Examples of the perfluoroalkyl group include 4,4,5,5,6,6,7,7,7-nonafluoroheptyl group, 4,4,5,5,6,6,7,7,8,8,9,9,9-tridecafluorononyl group and 4,4,5,5,6,6,7,7,8,8,9,9,10,10,11,11,11-heptadecafluoroun decyl group.

In the formula (5), $R^2$, $R^3$, $R^4$, $R^5$ and $R^6$ are each independently at least one group selected from the group consisting of alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms.

Examples of the alkyl group having 1 to 10 carbon atoms in the formula (5) include methyl group, ethyl group, propyl group, butyl group and heptyl group. Examples of the cycloalkyl group having 6 to 20 carbon atoms include cyclohexyl group, cyclooctyl group, cyclohexyl group and cyclodecyl group. Examples of the alkenyl group having 2 to 10 carbon atoms include ethenyl group, propenyl group, butenyl group and heptenyl group. Examples of the aryl group having 6 to 10 carbon atoms include phenyl group, tolyl group, dimethylphenyl group and naphthyl group. Examples of the aralkyl group having 7 to 20 carbon atoms include benzyl group, phenethyl group, methylbenzyl group, 2-phenylpropan-2-yl group and diphenylmethyl group.

In the formula (5), preferably, $R^2$, $R^3$, $R^4$, $R^5$ and $R^6$ are each independently at least one group selected from the group consisting of alkyl group having 1 to 10 carbon atoms and aryl group having 6 to 10 carbon atoms. Particularly preferably, they are each independently at least one group selected from the group consisting of methyl group and phenyl group.

"b" is an integer of preferably 0 to 3, more preferably 1 to 3, much more preferably 2 to 3. "c" is an integer of preferably 4 to 100, more preferably 4 to 50, much more preferably 8 to 50.

X in the formula (4) is at least one bond selected form the group consisting of single bond, ether bond, thioether bond, ester bond, amino bond and amide bond. X is preferably at least one bond selected from the group consisting of single bond, ether bond and ester bond. It is particularly preferably a single bond or ester bond.

"a" is an integer of preferably 1 to 5, more preferably 1 to 3, much more preferably 1.

The terminal group represented by the above formula (3) or (4) is preferably derived from a biogenic matter. Examples of the biogenic matter include long-chain alkyl alcohols having 14 or more carbon atoms such as cetanol, stearyl alcohol and behenyl alcohol.

The content of the terminal group represented by the formula (3) or (4) is preferably 0.3 to 9 wt %, more preferably 0.3 to 7.5 wt %, much more preferably 0.5 to 6 wt % based on the polymer main chain.

The moldability (releasability) and moisture absorption resistance of the resin composition are improved by containing the terminal group represented by the formula (3) or (4) in the terminal of the polycarbonate (component A).
(Specific Viscosity)

The lower limit of the specific viscosity at 20° C. of a solution prepared by dissolving 0.7 g of the polycarbonate (component A) in 100 ml of methylene chloride is preferably 0.14, more preferably 0.20, much more preferably 0.22. The upper limit of the specific viscosity is preferably 0.45, more preferably 0.40, much more preferably 0.34. When the specific viscosity is lower than 0.14, it is difficult to provide sufficiently high mechanical strength to a molded article obtained from the resin composition of the present invention. When the specific viscosity is higher than 0.45, melt flowability becomes too high and the melting temperature at which the resin composition has flowability required for molding is higher than the decomposition temperature disadvantageously.

(Glass Transition Temperature: Tg)

The lower limit of the glass transition temperature (Tg) of the polycarbonate (component A) is preferably 60° C., more preferably 80° C., much more preferably 90° C. The upper limit of the glass transition temperature (Tg) is preferably 165° C. Therefore, the glass transition temperature (Tg) of the polycarbonate (component A) is preferably 60 to 165° C.

When Tg is lower than 60° C., heat resistance degrades and when Tg is higher than 165° C., the melt flowability of the resin composition of the present invention deteriorates at the time of molding. Tg is measured by DSC (Model DSC2910) of TA Instruments.

(5% Weight Loss Temperature: Td)

The lower limit of the 5% weight loss temperature of the polycarbonate (component A) is preferably 280° C., more preferably 300° C. The upper limit of the 5% weight loss temperature is preferably 400° C., more preferably 390° C., much more preferably 380° C. Therefore, the 5% weight loss temperature (Td) of the polycarbonate (component A) is preferably 280 to 400° C. When the 5% weight loss temperature falls within the above range, the resin rarely decomposes at the time of molding the resin composition of the present invention. The 5% weight loss temperature is measured by TGA (Model TGA2950) of TA Instruments.

(Melt Viscosity)

The polycarbonate (component A) has a melt viscosity measured by a capillary rheometer at 240° C. of preferably $0.01 \times 10^3$ to $1.10 \times 10^3$ Pa·s, more preferably $0.05 \times 10^3$ to $1.0 \times 10^3$ Pa·s, much more preferably $0.1 \times 10^3$ to $0.8 \times 10^3$ Pa·s at a shear rate of 6,080 sec$^{-1}$. When the melt viscosity falls within this range, the polycarbonate has sufficiently high mechanical strength and high flowability, thereby making it possible to carry out secondary processing such as injection molding at a low temperature, whereby the deterioration of the resin by heat such as color deterioration or the reduction of polymerization degree is suppressed, and when molding is carried out by using the resin composition of the present invention, the defective fraction can be reduced advantageously.

(Production of Polycarbonate (Component A))

The copolycarbonate can be produced by melt polymerizing an ether diol represented by the following formula (a), a bisphenol, an aliphatic diol or alicyclic diol and a diester carbonate.

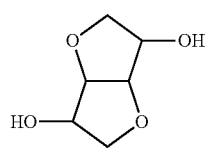

(a)

The diester carbonate is an ester such as an aryl group or aralkyl group having 6 to 12 carbon atoms which may be substituted. Specific examples thereof include diphenyl carbonate, ditolyl carbonate, bis(chlorophenyl)carbonate and bis(m-cresyl)carbonate. Out of these, diphenyl carbonate is particularly preferred.

The amount of diphenyl carbonate is preferably 0.97 to 1.10 moles, more preferably 0.99 to 1.05 moles based on 1 mole of the total of the dihydroxy compounds.

To increase the polymerization rate in the melt polymerization process, a polymerization catalyst may be used. The polymerization catalyst is selected from an alkali metal compound, an alkali earth metal compound, a nitrogen-containing compound and a metal compound.

As the above compounds, organic acid salts, inorganic salts, oxides, hydroxides, hydrides, alkoxides and quaternary ammonium hydroxides of an alkali metal or an alkali earth metal are preferably used. These compounds may be used alone or in combination.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, dibasic sodium phosphate, dibasic potassium phosphate, dibasic lithium phosphate, disodium phenylphosphate, disodium salts, dipotassium salts, dicesium salts and dilithium salts of bisphenol A, and sodium salts, potassium salts, cesium salts and lithium salts of phenol.

Examples of the alkali earth metal compound include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate and barium diacetate.

Examples of the nitrogen-containing compound include quaternary ammonium hydroxides having an alkyl or aryl group such as tetramethylammonium hydroxide, tetraethylammonium hydroxide, tetrapropylammonium hydroxide, tetrabutylammonium hydroxide and trimethylbenzylammonium hydroxide. Tertiary amines such as triethylamine, dimethylbenzylamine and triphenylamine, and imidazoles such as 2-methylimidazole, 2-phenylimidazole and benzimidazole may be used. Bases and basic salts such as ammonia, tetramethylammonium borohydride, tetrabutylammonium borohydride, tetrabutylammonium tetraphenylborate and tetraphenylammonium tetraphenylborate may also be used. Examples of the metal compound include zinc aluminum compounds, germanium compounds, organic tin compounds, antimony compounds, manganese compounds, titanium compounds and zirconium compounds. These compounds may be used alone or in combination of two or more.

When an alkali metal compound and/or an alkali earth metal compound are/is used as a polymerization catalyst, the amount of the polymerization catalyst is preferably $1 \times 10^{-9}$ to $1 \times 10^{-3}$ equivalent, more preferably $1 \times 10^{-8}$ to $1 \times 10^{-4}$ equivalent, much more preferably $1 \times 10^{-7}$ to $1 \times 10^{-5}$ equivalent based on 1 mole of the dial component.

When the nitrogen-containing compound is used as a polymerization catalyst, the amount of the polymerization catalyst is preferably $1 \times 10^{-7}$ to $1 \times 10^{-1}$ equivalent, more preferably $1 \times 10^{-6}$ to $1 \times 10^{-2}$ equivalent, much more preferably $1 \times 10^{-5}$ to $1 \times 10^{-3}$ equivalent based on 1 mole of the diol component.

The melt polycondensation reaction is carried out under heating and agitation in an inert atmosphere under reduced pressure while the formed monohydroxy compound is distilled off as having already been known. The melt polycondensation reaction may be carried out in a batch manner, continuous manner or a combination thereof. Melt polymerization may be carried out in two or more stages. In order to carry out copolymerization so as to achieve a predetermined composition ratio by using three or more monomers, it is necessary to control the reaction temperature and the reaction pressure accurately. An example of the melt polycondensation reaction is explained below. The production process is not limited to this.

That is, this reaction comprises an EI reaction step in which a transesterification reaction is carried out and a PA reaction step in which a polymerization reaction is carried out. The EI reaction step is a step for producing oligomers by reacting diol components with a carbonate precursor such as diester carbonate whereas the PA reaction step is a step for obtaining a high-molecular weight material by polycondensing the oligomers produced in the SI reaction step.

The EI reaction step is carried out at a final vacuum degree of 40 kPa to 0 kPa and a final resin temperature of 160 to 220° C. so as to distill off a monohydroxy compound produced as a side-reaction product in an amount of 70 to 85% of the theoretical amount. The theoretical amount of the monohydroxy compound is equivalent to 2 times the number of moles of the charged diester carbonate. The final vacuum degree is preferably 35 to 10 kPa. The depressurization rate is preferably 20 to 0.5 kPa/min, more preferably 15 to 1 kPa/min. The final resin temperature is preferably 180 to 210° C. When the final resin temperature is 160° C. or higher, reactivity becomes high, thereby reducing the reaction time with the result of high productivity. When the final resin temperature is 220° C. or lower, an unreacted ether diol is hardly deteriorated and the color of the obtained polymer is good.

At the time of transition from the EI reaction step to the PA reaction step, the amount of the monohydroxy compound distilled off is preferably 75 to 85% of the theoretical amount. When the amount of the monohydroxy compound distilled off falls within the above range, the reaction rate of the diol is 50 to 80% so that an unreacted diol having a low boiling point is hardly distilled off to the outside of the system in the PA reaction step. When the amount of the monohydroxy compound distilled off is smaller than 70% of the theoretical amount, the reaction rate of the aliphatic diol or the alicyclic diol becomes unsatisfactory, and the unreacted diol is distilled off to the outside of the system. As a result, the composition ratio of the obtained polymer is shifted from the proper range and also molar balance between the hydroxyl group and the carbonate group at the end of the polymer is lost, whereby the polymerization degree may not be fully increased in the latter stage of the PA reaction. Meanwhile, when the amount of the monohydroxy compound distilled off is more than 85% at the time of transition to the PA reaction step, the polymerization degree becomes too high, whereby the melt viscosity suddenly rises, thereby causing problems such as the reduction of yield and a discharge failure. The ether diol of the formula (a) has higher reactivity than other diols. When the reaction rate of the hydroxyl group of the aliphatic diol or the alicyclic diol falls within the above range, at the time of transition to the PA reaction step, it is hardly conceivable that the unreacted ether diol remains in an amount that causes the above problems. The bisphenol has lower reactivity than the ether diol of the formula (a) and the other diols, and the amount of the residual unreacted bisphenol at the time of transition to the PA reaction step is relatively large. However, since the bisphenol has a high boiling point and is not likely to be distilled off to the outside of the system at the time of transition to the PA reaction step, when the reaction rate of the hydroxyl group of the diol falls within the above range, there does not occur a problem such as a great shift of the composition ratio.

The PA reaction step consists of a former step and a latter step. That is, the former step of the PA reaction is a step for carrying out transesterification at a final vacuum degree of 8 to 1 kPa and a final resin temperature of 210 to 240° C. to obtain a polycarbonate having a specific viscosity of 0.03 or more to less than 0.2. In the former step, the oligomer of the copolycarbonate transesterified in the EI reaction step is further polymerized. The final vacuum degree is more preferably 5 to 1 kPa. The depressurization rate is preferably 5 kPa/min to 0.1 kPa/min. Preferably, transesterification is carried out to obtain a polycarbonate resin having a specific viscosity of 0.05 or more to less than 0.2. The final resin temperature is more preferably 220 to 235° C. Preferably, the temperature is gradually raised from the temperature of the EI reaction step and does not exceed the final temperature in mid-course. When the final temperature is 240° C. or lower, the remaining ether diol hardly deteriorates and the color of the obtained polymer is good. At a temperature of 210° C. or higher, the reaction tends to proceed and the ether diol hardly deteriorates due to its heat history so that the color of the polymer is good. At a final vacuum degree of 8 kPa or less, the phenol readily distills off and the reaction readily proceeds, whereby the ether diol hardly deteriorates due to its heat history and the color of the polymer is good. At a final vacuum degree of 1 kPa or more, molar balance is hardly lost and the molecular weight tends to increase.

The latter step of the PA reaction is a step for carrying out transesterification at a final vacuum degree of less than 1 kPa and a final resin temperature of 225 to 255° C. to obtain a polycarbonate resin having a specific viscosity of 0.14 to 0.45. In the latter step, the polycarbonate polymerized in the former step is further polymerized. At a final vacuum degree of less than 1 kPa, the formed phenol hardly remains in the system, the color of the resin is excellent, and a decomposition reaction is suppressed advantageously. The final vacuum degree is more preferably 0.5 kPa or less. At 225° C. or higher, the melt viscosity does not become too high and a problem such as the reduction of yield or a discharge failure hardly occurs. At 255° C. or lower, the ether diol residue hardly decomposes, and the color of the polymer is good. The final resin temperature is much more preferably 230 to 250° C. Preferably, the temperature is gradually raised from the temperature of the former step and does not exceed the final temperature in mid-course.

In this reaction, an end-sealing agent and an antioxidant may be optionally added.

In the latter stage of the reaction, a catalyst deactivator may be added. As the catalyst deactivator, known catalyst deactivators may be used effectively. Out of these, ammonium salts and phosphonium salts of sulfonic acid are preferred. Salts of dodecylbenzenesulfonic acid such as tetrabutylphosphonium salts of dodecylbenzenesulfonic acid and salts of paratoluenesulfonic acid such as tetrabutylammonium salts of paratoluenesulfonic acid are more preferred.

As the ester of sulfonic acid, methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used. Out of these, tetrabutylphosphonium salts of dodecylbenzenesulfonic acid are most preferably used. When at least one polymerization catalyst selected from alkali metal compounds and/or alkali earth metal compounds is used, the amount of the catalyst deactivator is preferably 0.1 to 10 moles, more preferably 0.3 to 5 moles, much more preferably 0.5 to 3 moles based on 1 mole of the catalyst.

Additives such as a heat stabilizer, plasticizer, optical stabilizer, polymerization metal deactivator, flame retardant, lubricant, antistatic agent, surfactant, antibacterial agent, ultraviolet absorbent and release agent may be optionally added according to purpose.

(Heat Stabilizer)

The polycarbonate (component A) preferably contains a heat stabilizer in particular so as to suppress the reduction of molecular weight and the deterioration of color during extrusion/molding. Since the ether diol residue as the unit (1) tends to be deteriorated and colored by heat and oxygen, a phosphorus-based stabilizer is preferably contained as the heat stabilizer. The phosphorus-based stabilizer is preferably a pentaerythritol type phosphite compound or a phosphite compound which reacts with a dihydric phenol and has a cyclic structure.

Examples of the above pentaerythritol type phosphite compound include distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol A pentaerythritol diphosphite, bis(nonylphenyl)pentaerythritol diphosphite and dicyclohexyl pentaerythritol diphosphite. Out of these, distearyl pentaerythritol diphosphite and bis(2,4-di-tert-butylphenyl) pentaerythritol diphosphite are particularly preferred.

Examples of the phosphite compound which reacts with a dihydric phenol and has a cyclic structure include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite, 2,2'-methylenebis(4-methyl-6-tert-butylphenyl)(2-tert-butyl-4-methylphenyl)phosphite, 2,2'-ethylidenebis(4-methyl-6-tert-butylphenyl)(2-tert-butyl-4-methylphenyl)phosphite, 2,2'-methylene-bis-(4,6-di-t-butylphenyl)octyl phosphite and 6-tert-butyl-4-[3-[(2,4,8,10)-tetra-tert-butyldibenzo[d.f][1,3,2]dioxaphosphepin-6-yl]oxy]propyl]-2-methyl phenol.

Other phosphorus-based stabilizers include phosphite compounds except for the above compounds, phosphonite compounds and phosphate compounds.

The above phosphite compounds include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris(2,4-di-tert-butylphenyl)phosphite and tris(2,6-di-tert-butylphenyl)phosphite.

The above phosphate compounds include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Triphenyl phosphate and trimethyl phosphate are preferred.

The above phosphonite compounds include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with the above phosphite compound having an aryl group substituted by 2 or more alkyl groups.

The phosphonate compounds include dimethyl benzenephosphonate, diethyl benzenephosphonate and dipropyl benzenephosphonate.

The above phosphorus-based heat stabilizers may be used alone or in combination of two or more.

The above phosphorus-based stabilizers may be used alone or in combination of two or more, and at least a pentaerythritol type phosphite compound or a phosphite compound having a cyclic structure is preferably used in an effective amount. The phosphorus-based stabilizer is used in an amount of preferably 0.001 to 1 part by weight, more preferably 0.01 to 0.5 part by weight, much more preferably 0.01 to 0.3 part by weight based on 100 parts by weight of the polycarbonate (component A).

A hindered phenol-based heat stabilizer may be added as a heat stabilizer in combination with a phosphorus-based heat stabilizer to the polycarbonate (component A) so as to suppress the reduction of molecular weight and the deterioration of color during extrusion/molding.

The hindered phenol-based stabilizer is not particularly limited if it has an antioxidant function. Examples of the hindered phenol-based stabilizer include n-octadecyl-3-(4'-hydroxy-3',5'-di-t-butylphenyl) propionate, tetrakis{methylene-3-(3',5'-di-t-butyl-4-hydroxyphenyl)propionate}methane, distearyl(4-hydroxy-3-methyl-5-t-butylbenzyl)malonate, triethylene glycol-bis{3-(3-t-butyl-5-methyl-4-hydroxyphenyl)propionate}, 1,6-hexanediol-bis{3-(3,5-di-t-butyl-4-hydroxyphenyl) propionate}, pentaerythrityl-tetrakis{3-(3,5-di-t-butyl-4-hydroxyphenyl) propionate}, 2,2-thiodiethylenebis{3-(3,5-di-t-butyl-4-hydroxyphenyl) propionate}, 2,2-thiobis(4-methyl-6-t-butylphenol), 1,3,5-trimethyl-2,4,6-tris(3,5-di-t-butyl-4-hydroxybenzyl)benzene, tris(3,5-di-t-butyl-4-hydroxybenzyl)-isocyanurate, 2,4-bis{(octylthio)methyl}-o-cresol, isooctyl-3-(3,5-di-t-butyl-4-hydroxyphenyl) propionate, 2,5,7,8-tetramethyl-2(4',8',12'-trimethyltridecyl)chroman-6-ol and 3,3',3'',5',5''-hexa-t-butyl-a,a',a''-(mesitylene-2,4,6-triyl)tri-p-cresol.

Out of these, n-octadecyl-3-(4'-hydroxy-3',5'-di-t-butylphenyl) propionate, pentaerythrityl-tetrakis{3-(3,5-di-t-butyl-4-hydroxyphenyl)propionate}, 3,3',3'',5,5',5''-hexa-t-butyl-a,a',a''-(mesitylene-2,4,6-triyl)tri-p-cresol and 2,2-thiodiethylenebis{3-(3,5-di-t-butyl-4-hydroxyphenyl) propionate} are preferred.

These hindered phenol-based stabilizers may be used alone or in combination of two or more.

The hindered phenol-based stabilizer is used in an amount of preferably 0.001 to 1 part by weight, more preferably 0.01 to 0.5 part by weight, much more preferably 0.01 to 0.3 part by weight based on 100 parts by weight of the polycarbonate (component A).

(Release Agent)

The polycarbonate (component A) may contain a release agent as long as the object of the present invention is not impaired so as to further improve its releasability from a mold at the time of melt molding.

The release agent is selected from a higher fatty acid ester of a monohydric or polyhydric alcohol, higher fatty acid, paraffin wax, beeswax, olefin-based wax, olefin-based wax containing a carboxyl group and/or a carboxylic anhydride group, silicone oil and organopolysiloxane.

The higher fatty acid ester is preferably a partial ester or full ester of a monohydric or polyhydric alcohol having 1 to 20 carbon atoms and a saturated fatty acid having 10 to 30 carbon atoms. Examples of the partial ester or full ester of a monohydric or polyhydric alcohol and a saturated fatty acid include monoglyceride stearate, diglyceride stearate, triglyceride stearate, monosorbitate stearate, stearyl stearate, monoglyceride behenate, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate and 2-ethylhexyl stearate. Out of these, monoglyceride stearate, triglyceride stearate, pentaerythritol tetrastearate and behenyl behenate are preferably used.

The higher fatty acid is preferably a saturated fatty acid having 10 to 30 carbon atoms. Examples of the fatty acid include myristic acid, lauric acid, palmitic acid, stearic acid and behenic acid.

These release agents may be used alone or in combination of two or more. The amount of the release agent is preferably 0.01 to 5 parts by weight based on 100 parts by weight of the polycarbonate (component A)

(Ultraviolet Absorbent, Optical Stabilizer)

The resin composition of the present invention may comprise an ultraviolet absorbent and an optical stabilizer as long as the object of the present invention is not impaired.

The ultraviolet absorbent is, for example, a benzophenone-based ultraviolet absorbent typified by 2-hydroxy-4-n-dodecyloxybenzophenone, 2,2'-dihydroxy-4,4'-dimethoxybenzophenone and bis(5-benzoyl-4-hydroxy-2-methoxyphenyl)methane. Other ultraviolet absorbents include benzotriazole-based ultraviolet absorbents typified by 2-(2'-hydroxy-5'-methylphenyl)benzotriazole, 2-(2'-hydroxy-3',5'-di-tert-amylphenyl)benzotriazole, 2-(2'-hydroxy-3',5'-bis($\alpha,\alpha'$-dimethylbenzyl)phenylbenzotriazole, 2,2'-methylenebis[4-(1,1,3,3-tetramethylbutyl)-6-(2H-benzotriazol-2-yl)phenol] and condensate of methyl-3-[3-tert-butyl-5-(2H-benzotriazol-2-yl)-4-hydroxyphenylpropionate and polyethylene glycol. Further, hydroxyhenyltriazine-based compounds such as 2-(4,6-diphenyl-1,3,5-triazin-2-yl)-5-hexyloxyphenol and 2-(4,6-bis(2,4-dimethylphenyl)-1,3,5-triazin-2-yl)-5-hexyloxyphenol may be used as the ultraviolet absorbent. Hindered amine-based optical stabilizers typified by bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidy])-1,2,3,4-butane tetracarboxylate, poly{[6-(1,1,3,3-tetramethylbutyl)amino-1,3,5-triazin-2,4-diyl][(2,2,6,6-tetramethylpiperidyl)imino]hexamethylene[(2,2,6,6-tetramethylpiperidyl)imino]} and polymethylpropyl-3-oxy-[4-(2,2,6,6-tetramethyl) piperidinyl]siloxane may also be included. These optical stabilizers exhibit more excellent performance in terms of weatherability when they are used in combination with the above ultraviolet absorbent and an antioxidant.

These ultraviolet absorbents and optical stabilizers may be used alone or in combination of two or more. The amounts of the ultraviolet absorbent and the optical stabilizer are each preferably 0.01 to 2.0 parts by weight based on 100 parts by weight of the polycarbonate.

(Bluing Agent)

The resin composition of the present invention may comprise a bluing agent to erase the yellow tinge of a lens based on a polymer and an ultraviolet absorbent. A bluing agent which is generally used for polycarbonates may be used without any problem. In general, anthraquinone-based dyes are easily acquired and preferred.

Typical examples of the bluing agent include generic name Solvent Violet 13 [CA. No (color index No) 60725], generic name Solvent Violet 31 [CA. No 68210], generic name Solvent Violet 33 [CA. No 60725], generic name Solvent Blue 94 [CA. No 61500], generic name Solvent Violet 36 [CA. No 68210], generic name Solvent Blue 97 [Macrolex Blue RR of Bayer AG] and generic name Solvent Blue 45 [CA. No 61110].

These bluing agents may be used alone or in combination of two or more. The amount of the bluing agent is preferably $0.1 \times 10^{-4}$ to $2 \times 10^{-4}$ part by weight based on 100 parts by weight of the polycarbonate (component A).

(Fluorescent Dye, Dye)

The resin composition of the present invention may comprise a fluorescent dye or a dye to be used for transparent color molded articles as long as its transparency is not impaired.

The fluorescent dye is not particularly limited if it can be used for thermoplastic resins, as exemplified by xanthene-, thiazole-, thiazine-, perylene-, coumalin- and diaminostilbene-based fluorescent dyes. Out of these, perylene- and coumalin-based fluorescent dyes such as the Lumogen Color of BASF, the Fluorescent of Arimoto Chemical Co., Ltd. and the Macrolex of Bayer AG are easily acquired as commercial products and may be preferably used.

The amount of the fluorescent dye is preferably 0.001 to 5 parts by weight, more preferably 0.01 to 2 parts by weight based on 100 parts by weight of the total of it and the polycarbonate (component A). When the amount of the fluorescent dye is smaller than 0.001 part by weight, fluorescence is hardly obtained and when the amount is larger than 5 wt %, transparency degrades and discoloration becomes marked, whereby fluorescence of interest cannot be obtained.

The polycarbonate (component A) is mixed with the above additives by means of, for example, a tumbler, twin-cylinder mixer, super mixer, Nauter mixer, Banbury mixer, kneading roll or extruder, or the above components are mixed together while they are dissolved in a common good solvent such as methylene chloride. The method of mixing these components is not particularly limited, and any polymer blending method which is generally used may be employed.

(Component B: Impact Resistance Modifier)

The resin composition of the present invention comprises an impact resistance modifier (component B). The impact resistance modifier (component B) is preferably a core-shell type polymer consisting of a core composed of a rubbery polymer and a shell obtained by graft polymerization to the rubbery polymer. Since the impact resistance modifier is a core-shell type polymer, its dispersibility in the polycarbonate becomes high and high impact strength tends to be obtained.

The average particle diameter of the impact resistance modifier (component B) is preferably 10 to 500 nm. It is more preferably 30 to 300 nm, much more preferably 50 to 200 nm and most preferably 50 to 180 nm. When the average particle diameter is 10 nm, sufficiently high impact strength tends not to be obtained. When the average particle diameter is larger than 500 nm, the transparency of the obtained resin composition tends to degrade. The average particle diameter is measured while the rubbery polymer and the graft copolymer are in a latex form. The MICROTRAC UPA150 of Nikkiso Co., Ltd. was used to measure the volume average particle diameter.

It is preferred that the rubbery polymer corresponding to the core of the impact resistance modifier (component B) is a rubbery polymer of a vinyl-based monomer or a polymer of a diene-based monomer and a vinyl-based monomer, and the vinyl-based monomer is at least one selected from (meth) acrylic acid monomers and (meth)acrylic acid alkyl ester monomers because the transparency and impact resistance strength of the resin composition of the present invention are obtained at the same time and from the viewpoint of raw material costs.

The term "(meth)acrylic acid monomers" refers to acrylic acid monomers, methacrylic acid monomers and mixtures thereof. The term "(meth)acrylic acid alkyl ester monomers" refers to acrylic acid alkyl ester monomers, methacrylic acid alkyl ester monomers and mixtures thereof.

An example of the diene-based monomer is 1,3-butadiene. Examples of the (meth)acrylic acid monomers and the (meth) acrylic acid alkyl ester monomers include acrylic acid, methacrylic acid, ethyl acrylate, butyl acrylate, 2-ethylhexyl acrylate, methyl methacrylate, ethyl methacrylate, butyl methacrylate, 2-hydroxyethyl methacrylate and glycidyl methacrylate. Polymers obtained from these monomers include butadiene-acrylate copolymers.

The glass transition temperature (Tg) of the rubbery polymer is preferably 0° C. or lower from the viewpoint of the improvement of impact resistance. It is more preferably −20° C. or lower, much more preferably −40° C. or lower.

The shell of the impact resistance modifier (component B) is composed of at least one vinyl-based monomer. The shell can be formed by graft polymerizing at least one vinyl-based monomer.

The vinyl-based monomer is selected from aromatic vinyl compounds, vinyl cyanide compounds, unsaturated carboxylic acids and unsaturated carboxylic acid esters. Out of the aromatic vinyl compounds, styrene and α-methylstyrene are preferred, out of the vinyl cyanide compounds, acrylonitrile and methacrylonitrile are preferred, and out of the unsaturated carboxylic acids and unsaturated carboxylic acid esters, acrylic acid, methacrylic acid and acrylic acid esters and methacrylic acid esters having an alkyl ester with 1 to 12 carbon atoms are preferred. An unsaturated carboxylic acid ester or a mixture of an unsaturated carboxylic acid ester and an aromatic vinyl compound is preferred as the vinyl-based monomer for use in graft polymerization as it is excellent in dispersibility in the polycarbonate (component A) and the transparency of the obtained resin composition.

Further, one or more reactive groups selected from epoxy group, hydroxyl group, carboxy group, alkoxy group, isocyanato group, acid anhydride group and acid chloride group may be introduced into the graft portion of the impact resistance modifier (component B). Thereby, dispersibility and impact resistance may be improved as compared with a case where a rubber graft copolymer containing no reactive group is used.

Preferably, the refractive index of the impact resistance modifier (component B) is 1.490 to 1.510 and the difference in refractive index between the impact resistance modifier and the polycarbonate (component A) is 0.010 or less.

As for the production process of the impact resistance modifier (component B), bulk polymerization, solution polymerization, suspension polymerization and emulsion polymerization may be employed but emulsion polymerization, that is, emulsion graft polymerization is preferred. Stated more specifically, latex is added to a reactor equipped with a stirrer, a vinyl-based monomer, a polymerization initiator and water are further added to the reactor, a chain transfer agent and a redox agent are optionally charged, and these materials are heated under agitation.

The polymerization initiator, the chain transfer agent and the redox agent are not particularly limited and known ones may be used. The method of adding these raw materials to the reactor is not particularly limited, and all of these raw materials may be added in a batch manner, or they are divided and added separately before the start of polymerization. Graft polymerization is carried out in a single stage or two or more stages, the compositions of monomers in these stages may be the same or different, and all the monomers may be added in a batch manner, continuous manner or in a combination thereof.

When emulsion polymerization is employed, a known polymerization initiator, that is, a thermally decomposable polymerization initiator such as 2,2'-azobisisobutyronitrile, hydrogen peroxide, potassium persulfate or ammonium persulfate may be used. Further, a redox type polymerization initiator containing a peroxide such as an organic peroxide exemplified by t-butylperoxy isopropyl carbonate, paramenthane hydroperoxide, cumene hydroperoxide, dicumyl peroxide, t-butyl hydroperoxide, di-t-butyl peroxide and t-hexyl peroxide or an inorganic peroxide exemplified by hydrogen peroxide, potassium persulfate and ammonium persulfate, and optionally a reducing agent such as sodium formaldehyde sulfoxylate or glucose, a transition metal salt such as iron sulfate (II), a chelating agent such as disodium ethylenediamine tetraacetate and a phosphorus-based flame retardant such as sodium pyrophosphate may be used.

Since polymerization can be carried out at a low temperature at which the above peroxide is substantially not thermally decomposed when the redox type polymerization initiator is used, the polymerization temperature can be set to a wide range advantageously. It is particularly preferred to use an aromatic ring-containing peroxide such as cumene hydroperoxide or dicumyl peroxide as a redox type polymerization initiator. The amount of the above polymerization initiator and the amounts of the above reducing agent, transition metal salt and chelating agent when the redox type polymerization initiator is used may be selected from known ranges.

To synthesize the impact resistance modifier (component B) by emulsion polymerization, conventionally known polymerization emulsifiers such as alkali metal salts of a higher fatty acid exemplified by disproportionated rosin acid, oleic acid and stearic acid, alkali metal salts of a phosphoric acid-based compound, and alkali metal salts of sulfonic acid-based or sulfuric acid-based compound may be used.

When the impact resistance modifier (component B) is obtained by emulsion polymerization, the impact resistance modifier can be separated from an aqueous medium by heating, dehydrating, washing and drying in accordance with a known method after it is coagulated by mixing latex of an impact modifier (component B) and an acid such as hydrochloric acid or a metal salt having a valence of 2 or more such as calcium chloride, magnesium sulfate, aluminum chloride or calcium acetate (may also be referred to as "coagulation method"). Or, the impact resistance modifier may be precipitated by adding a water-soluble organic solvent such as alcohol exemplified by methanol, ethanol and propanol or acetone to latex, separated from the solvent by centrifugation or filtration, dried and isolated. As an alternative method, an organic solvent having slight water solubility such as methyl ethyl ketone is added to latex containing the impact resistance modifier used in the present invention so that the impact resistance modifier component contained in the latex is extracted into an organic solvent layer, the organic solvent layer is separated, and the impact resistance modifier component is mixed with water to precipitate the impact resistance modifier component. The latex can be directly powdered by a spray drying method.

<Resin Composition>]

The content of the impact resistance modifier (component B) in the resin composition of the present invention is 2 to 20 parts by weight, preferably 3 to 15 parts by weight, more preferably 5 to 10 parts by weight based on 100 parts by weight of the polycarbonate (component A). When the content of the impact resistance modifier (component B) is lower than 2 parts by weight, impact strength is not fully developed, and when the content is higher than 20 parts by weight, heat resistance or stiffness degrades.

(Impact Resistance Modifier Domains)

In the resin composition of the present invention, the average size of the impact resistance modifier domains is 5 to 200 nm. The lower limit of the average size is preferably 10 nm, more preferably 50 nm. The upper limit of the average size is preferably 180 nm, more preferably 150 nm. Below the lower limit of the above range, impact resistance is not fully developed and above the upper limit, transparency is not developed stably.

Further, even when the average size of the impact resistance modifier domains falls within a preferred range, if normalized dispersity thereof exceeds 17%, high and stable transparency is not developed. The normalized dispersity of the impact resistance modifier domain sizes is not more than 17%, preferably not more than 16.5%. The lower limit of the normalized dispersity is preferably not less than 5%, more preferably not less than 7%, much more preferably not less than 10% for practical use. When the impact resistance modifier has the above suitable average domain size and the above suitable normalized dispersity, a polycarbonate resin and a molded article thereof having both transparency and impact resistance are provided.

The average domain size and normalized dispersity of the impact resistance modifier of the resin composition of the present invention are evaluated by a small angle X-ray scattering (SAXS) method. The small angle X-ray scattering method is a method for measuring diffuse scattering/diffraction which occurs in a small-angle area having a scattering angle ($2\theta$) of less than $10°$. In this small angle X-ray scattering method, when there are areas as large as 1 to 100 nm which differ in electron density in a substance, the diffuse scattering of an X-ray due to the difference in electron density is measured. The particle diameter of an object to be measured is obtained based on this scattering angle and the scattering intensity.

In the case of a resin composition having an aggregation structure that impact resistance modifier domains are dispersed in a polycarbonate polymer matrix, the diffuse scattering of an X-ray occurs due to the difference in electron density between the polycarbonate matrix and the impact resistance modifier domains. A small-angle X-ray scattering profile is obtained by measuring scattering intensity I at each scattering angle ($2\theta$) smaller than $10°$, and simulation is carried out by using commercially available analysis software to obtain the average size of the impact resistance modifier domains and a particle size distribution (normalized dispersity) from provisional particle sizes and a provisional particle size, distribution model based on the assumption that the impact resistance modifier domains are spherical domains and there are variations in particle size distribution.

According to the small, angle X-ray scattering method, the average size of the impact resistance modifier domains dispersed in the polycarbonate matrix and the particle size distribution both of which cannot be measured accurately by observation through a transmission electron microscope can be measured accurately and easily with high reproducibility.

The term "average domain size" means the number average of domain sizes. The term "normalized dispersity" means a parameter obtained by normalizing the spread of a particle size distribution with the average size. More specifically, it is a value obtained by normalizing the dispersity of the impact resistance modifier domain sizes with the average domain size and represented by the following equation (2).

$$\text{Normalized dispersity (\%)} = \delta/D_{av} \qquad (2)$$

In the above equation (2), $\delta$ is the standard deviation of impact resistance modifier domain sizes, and $D_{av}$ is the average domain size.

The terms "average domain size" and "normalized dispersity" used in association with the present invention are measurement values obtained by measuring a 1.0 mm-thick molded article formed by injection molding in accordance with the small angle X-ray scattering method. More specifically, a triple plate (having a width of 50 mm, a length of 90 mm, a thickness of 3.0 mm (length of 20 mm), 2.0 mm (length of 45 mm) and 1.0 mm (length of 25 mm) from the gate side and an arithmetic average surface roughness (Ra) of 0.03 μm) formed by injection molding is used to measure the average size of impact resistance modifier domains and the particle size distribution (normalized dispersity) at an intersection which is 5 mm away from the end of a 1.0 mm-thick portion and 5 mm away from the side by the small angle X-ray scattering method.

(Total Light Transmittance)

Preferably, a molded article having a thickness of 3.0 mm formed by injection molding the resin composition of the present invention has a total light transmittance of not less than 88%. The total light transmittance is more preferably not less than 88.5%, much more preferably not less than 89%. The upper limit of the total light transmittance is preferably 95%, more preferably 94%, much more preferably 93%. The 3.0 mm-thick molded article of the resin composition of the present invention preferably has a haze of 0.3 to 20%. The haze is more preferably not more than 10%, much more preferably 0.5 to 10%, particularly preferably 0.6 to 5%, most preferably 0.7 to 3%.

The term "total light transmittance" used in association with the present invention indicates the level of transparency and means the ratio of transmitted light to incident light measured by the method E308 of ASTM-D1003-61. The term "haze" used in association with the present invention indicates the level of transparency and means the percentage (%) of transmitted light deviated from an incident light flux by forward scattering when it passes through a test specimen (ASTM-D1003-61). That is, as the total light transmittance becomes higher and the haze becomes lower, transparency becomes higher.

(Production of Resin Composition)

The resin composition of the present invention can be produced by premixing components and optional components, melt kneading them together and pelletizing the kneaded product. Examples of the premixing means include a Nauter mixer, a twin-cylinder mixer, a Henschel mixer, a mechanochemical device and an extrusion mixer. During premixing, the resulting mixture may be granulated by means of an extrusion granulator or a briquetting machine. After premixing, the obtained mixture is melt kneaded by means of a melt kneader typified by a vented double-screw extruder and pelletized by means of a device such as a pelletizer. Other examples of the melt kneader include a Banbury mixer, a kneading roll and a constant heat stirring vessel, and a vented double-screw extruder is preferred. Alternatively, the components and the optional components may be supplied into a melt kneader typified by a double-screw extruder independently without being premixed together. The cylinder temperature at the time of melt kneading is preferably 180 to 270° C., more preferably 190 to 260° C., much more preferably 200 to 250° C. When the cylinder temperature exceeds 270° C., the thermal decomposition of the polycarbonate proceeds markedly.

The resin composition of the present invention is preferably produced by melt kneading together the above components by means of an extruder. The extruder is particularly preferably a double-screw extruder having a vent from which water contained in the raw materials and a volatile gas generated from the molten kneaded resin can be removed. A vacuum pump is preferably installed to discharge the generated water and volatile gas to the outside of the extruder from the vent efficiently.

A screen for removing foreign matter contained in the extruded raw material may be installed in a zone before the die of the extruder to remove the foreign matter from the resin composition. Examples of the screen include a metal net, a screen changer and a sintered metal plate (such as a disk filter).

The method of supplying the component B and additives (to be simply referred to as "additives" in the following examples) into the extruder is not particularly limited. The following methods are typical examples of the method: (i) one in which the additives are supplied into an extruder separately from the resin as the component A, (ii) one in which the additives and the resin powders as the component A are premixed together by means of a mixer such as a super mixer and supplied into the extruder, (iii) one in which the additives and the resin as the component A are melt kneaded together in advance to produce a master pellet, and (iv) one in which the resin and the additives are uniformly dispersed in a solvent to prepare a solution and the solvent is removed as another premixing method.

The resin composition extruded from the extruder is pelletized by directly cutting it or by forming a strand from the resin composition and cutting it with a pelletizer. When the influence of extraneous dust must be reduced, the atmosphere surrounding the extruder is preferably made clean. In the production of the above pellets, it is preferred to narrow the form distribution of the pellets, reduce the number of miscut products, reduce the amount of fine powders produced at the time of conveyance or transportation and cut the number of cells (vacuum cells) formed in the strand or pellet by using methods already proposed for polycarbonates for use in optical disks and cyclic polyolefin resin for optical use. Thereby, it is possible to increase the molding cycle and reduce the incidence of a defect such as a silver streak.

The shape of the pellet may be columnar, rectangular column-like, spherical or other ordinary shape, preferably columnar. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

<Molded Article>

The present invention includes a molded article formed from the above resin composition. The molded article can be manufactured by injection molding, extrusion molding or the like.

Injection molding is preferably carried out at a cylinder temperature of 180 to 270° C. To suppress coloration and the reduction of molecular weight by the decomposition of the polymer, the cylinder temperature is preferably 180 to 270° C., more preferably 190 to 260° C. When the cylinder temperature is higher than 270° C., the decomposition of the polymer is greatly promoted. Although the mold temperature may be 40 to 140° C., it is preferably 40 to 120° C., more preferably 40 to 100° C. in order to shorten the molding cycle and the melt residence time of the resin.

For injection molding, not only standard cold-runner molding technique but also hot-runner molding technique may be employed. In injection molding, not only standard molding techniques but also injection molding techniques such as injection compression molding, injection press molding, gas assist injection molding, foam molding (including what comprises the injection of a super-critical fluid), insert molding, in-mold coating molding, insulated runner molding, quick heating and cooling molding, two-color molding, sandwich molding and super high-speed injection molding may be used according to purpose. The advantages of these molding techniques are already widely known.

The resin composition of the present invention may be formed into an odd-shaped extrusion molded article, a sheet or a film by extrusion molding. Inflation, calendering and casting techniques may also be used to mold a sheet or a film. Further, specific drawing operation may be used to mold it into a heat shrinkable tube. The resin composition of the present invention can be formed into a molded article by rotational molding or blow molding.

<Method of Use>

The present invention includes a method of using an impact resistance modifier which satisfies the following requirements (a) to (d) in a polycarbonate containing not less than 30 mol % of a recurring unit represented by the above formula (1).

(a) The impact resistance modifier is a core-shell type polymer;
(b) the core is composed of a rubbery polymer of a vinyl-based monomer or a rubbery polymer of a diene-based monomer and a vinyl-based monomer, wherein the vinyl-based monomer is at least one selected from (meth)acrylic acid monomers and (meth)acrylic acid alkyl ester monomers;
(c) the shell is composed of a polymer of at least one vinyl-based monomer; and
(d) the average particle diameter of the core-shell type polymer is 10 to 500 nm.

EXAMPLES

The following examples are provided for the purpose of further illustrating the present invention but are in no way to be taken as limiting. "Parts" in the examples means "parts by weight" and "%" means "wt %". Evaluations were made by the following methods.

(1) Specific Viscosity ($\eta_{sp}$)

A pellet was dissolved in methylene chloride to a concentration of about 0.7 g/dL so as to measure the specific viscosity of the resulting solution with an Ostwald viscometer (name of device: RIGO AUTO VISCOSIMETER TYPE VMR-0525·PC) at 20° C. The specific viscosity ($\eta_{sp}$) was obtained from the following equation.

$$\eta_{sp} = t/t_0 - 1$$

(t: flow time of a sample solution, $t_0$: flow time of a solvent alone)

(2) Glass Transition Temperature (Tg)

The pellet was used to measure its glass transition temperature with the DSC (DSC2910) of TA Instruments.

(3) Melt Viscosity

The capillary rheometer (Capillograph Model 1D) of Toyoseiki Co., Ltd. was used to obtain a shear rate/viscosity curve from measurement results by changing the measurement speed arbitrarily at a capillary length of 10.0 mm, a capillary diameter of 1.0 mm and a measurement temperature of 240° C. so as to read a melt viscosity at 6,080 $\sec^{-1}$ therefrom.

(4) Notched Charpy Impact Strength

After the pellet was dried at 80 to 110° C. for 12 hours, a bending test specimen and a tensile test specimen were molded out of the pellet with the JSWJ-75EIII of The Japan Steel Works, Ltd. at a cylinder temperature of 225° C. and a mold temperature of 90° C. A notched Charpy impact test was made on these test specimens in accordance with ISO179.

(5) Tensile Breaking Stress, Breaking Nominal Strain

A tensile test was made on the tensile test specimen prepared in (4) above in accordance with ISO527.

(6) Flexural Strength, Flexural Modulus

A bending test was made on the bending test specimen prepared in (4) above in accordance with ISO178.

(7) Deflection Temperature under Load (0.45 MPa)

The deflection temperature under a low load (0.45 MPa) of the bending test specimen prepared in (4) above was measured in accordance with ISO75.

(8) Pencil Hardness

The pellet was molded into a 2 mm-thick square plate at a cylinder temperature of 250° C. and a mold temperature of 80° C. at a 1-minute cycle by using the J85-ELIII injection molding machine of The Japan Steel Works, Ltd. to measure the pencil hardness of this test specimen in accordance with the base map board testing method of JIS K5600.

(9) Refractive Index

A film having a thickness of 300 to 600 μm was formed by press molding to measure its refractive index at 25° C. and a wavelength of 589 nm by using the DR-M2 multiwavelength Abbe's refractometer of Atago Mfg. Co., Ltd. in accordance with JIS K7142.

(10) Total Light Transmittance

After the pellet of the resin composition was dried with hot air at 120° C. for 5 hours, it was molded into a triple plate having a width of 50 mm, a length of 90 mm and a thickness of 3.0 mm (length of 20 mm), 2.0 mm (length of 45 mm) and 1.0 mm (length of 25 mm) from the gate side and an arithmetic average surface roughness (Ra) of 0.03 μm by means of an injection molding machine (JSW J-75EIII of The Japan Steel Works, Ltd.) at a molding temperature of 240° C., a mold temperature of 80° C. and a molding cycle of 50 seconds. The total light transmittance of a 3.0 mm-thick portion of the triple plate was measured by using the Haze Meter NDH 2000 of Nippon Denshoku Industries Co., Ltd. in accordance with ISO13468.

(11) Haze

The haze of a 3.0 mm-thick portion of the triple plate prepared in (10) above was measured by using the Haze Meter NDH 2000 of Nippon Denshoku Industries Co., Ltd. in accordance with ISO17482.

(12) High-Speed Surface Impact Test

A 2 mm-thick portion of the triple plate prepared in (10) above was cut to a size of 50 mm×45 mm and left in a 23° C.×50% RH environment for 1 week to adjust the state of the obtained test specimen, and then a high-speed surface impact test was made on the test specimen. The Hydroshot HTM-1 high-speed surface impact tester (of Shimadzu Corporation) was used and a tray having an impact shaft whose tip is hemispherical and has a diameter of 12.7 mm and a hole diameter of 25.4 mm was used in the test. The collision velocity of the impact shaft was 5 m/sec, and the measurement temperature was −30° C. The measurement at −30° C. was carried out as follows. A stainless steel container was prepared, and polyethylene beads were filled into the container. Further, the test specimen was buried in the beads. This is aimed to reduce the influence of the bias of heat conduction. This stainless steel container was kept in a −30° C. refrigerator to keep the test specimen at −30° C. At the time of the test, this test specimen was taken out from the refrigerator quickly and set in an impact tester to carry out the test. It was confirmed by thermography that the test was carried out at a test specimen temperature of almost −30° C. Five test specimens were measured at each level to observe their fracture morphology. As for the evaluation results, ○ indicates that ductile fracture is seen in three or more molded specimens and X indicates other cases.

(13) Average Size of Impact Resistance Modifier Domains and Normalized Dispersity The triple plate prepared in (10) above was used to measure the average size of impact resistance modifier domains and the particle size distribution (normalized dispersity) at an intersection which was 5 mm away from the end of a 1.0 mm-thick portion and 5 mm away from the side by means of an X-ray diffraction apparatus (RINT-TTRIII of Rigaku Corporation). An X-ray source producing a CuKα characteristic X-ray (wavelength of 0.1541841 nm) and having a tube voltage of 50 kV and a tube current of 300 mA was used. The small angle scattering optical system had a first slit of 0.03 mm with HS of 10 mm, SS of 0.2 mm and RS of 0.1 mm. Measurement was made under the conditions of FT 0.01° step, 4 sec/step and a scanning range of 0.06-3° by an asymmetric scanning method (2θ scan). The NANO-Solver (Ver. 3.3) small angle scattering analysis software of Rigaku Corporation was used for the analysis of curve fitting. Analysis was made on an isolated particle model in which interaction between particles (interference between particles) was not taken into consideration, at a polycarbonate matrix density of 1.2 g/cm$^3$ and an impact resistance modifier domain density of 1.1 g/cm$^3$ based on the assumption that it had an aggregation structure that impact resistance modifier spherical domains were dispersed in the polycarbonate polymer matrix and there were variations in particle size distribution.

Reference Example 1

Production of Copolycarbonate (PC-1)

375.99 parts of isosorbide (to be abbreviated as ISS hereinafter), 101.40 parts of 1,6-hexanediol (to be abbreviated as HD hereinafter), 749.70 parts of diphenyl carbonate (to be abbreviated as DPC hereinafter), and 3.0×10$^{-2}$ part of tetramethylammonium hydroxide and 1.0×10$^{-4}$ part of sodium hydroxide as catalysts were heated at 170° C. in a nitrogen atmosphere to be molten. After it was confirmed that these substances were molten, an EI reaction step was started. After the start of depressurization, the pressure was reduced to a final level of 13.4 kPa over 70 minutes and maintained at that level after 13.4 kPa was reached. Concurrently with the start of depressurization, the temperature was raised at a rate of 10° C./hr until the final resin temperature became 190° C. After 190° C. was reached, the resin was maintained at a pressure of 13.4 kPa and a temperature of 190° C. for 10 minutes until 80% of the theoretical amount of phenol was distilled off. After it was confirmed that 80% of the theoretical amount of phenol was distilled off, a PA reaction step (former step) was started. The temperature was raised at a rate of 0.5° C./min until the final resin temperature became 220° C. Concurrently with this, the pressure was reduced over 60 minutes until the final pressure became 3 kPa. Subsequently, the PA reaction step (latter step) was started. In the latter step, the temperature was raised at a rate of 1° C./min until the final resin temperature became 240° C. Concurrently with this, the pressure was reduced over 20 minutes until the final pressure became 134 Pa. When a predetermined agitation power value was reached, the reaction was terminated, a tetrabutylphosphonium salt of dodecylbenzenesulfonic acid was added in an amount 2 times the total molar amount of the catalysts to deactivate the catalysts, and the reaction product was discharged from the bottom of a reactor under nitrogen increased pressure and cut by a pelletizer while cooled in a water tank to obtain a pellet. The pellet had a specific viscosity of 0.34, a glass transition temperature of 97° C. and a melt viscosity of 347 Pa·s.

Then, a T die having a width of 150 mm and a lip width of 500 μm and a film take-up device were set in the 15φ double-screw extrusion kneader of Technobell Co., Ltd. to mold the obtained polycarbonate at 240° C. so as to obtain a transparent extruded film. A 50 mm×10 mm sample was cut out from the obtained film and had a refractive index of 1.499.

Reference Example 2

Production of Copolycarbonate (PC-2)

A pellet having a specific viscosity of 0.28 was obtained in the same manner as in Example 1 except that 340.90 parts of ISS, 158.34 parts of cyclohexane dimethanol (to be abbreviated as CHDM hereinafter) and 749.70 parts of DPC were used. The specific viscosity, glass transition temperature and melt viscosity of the pellet were measured and shown in Table 1. A film was formed in the same manner as in Reference Example 1 to measure its refractive index which is shown in Table 1.

Reference Example 3

Production of Copolycarbonate (PC-3)

The procedure of Example 1 was repeated except that 401.06 parts of ISS, 171.57 parts of bisphenol A (to be abbreviated as BPA hereinafter), 60.84 parts of HD and 749.70 parts of DPC were used. The specific viscosity, glass transition temperature and melt viscosity of the obtained pellet were measured and shown in Table 1. A film was formed in the same manner as in Reference Example 1 to measure its refractive index which is shown in Table 1.

TABLE 1

| | Charge ratio (mol %) | | | | specific viscosity | Tg (° C.) | refractive index | melt viscosity (Pa·s) |
|---|---|---|---|---|---|---|---|---|
| | ISS | BPA | HD | CHDM | | | | |
| PC-1 | 75 | — | 25 | — | 0.34 | 97 | 1.499 | 347 |
| PC-2 | 68 | — | — | 32 | 0.32 | 118 | 1.501 | 515 |
| PC-3 | 80 | 5 | 15 | — | 0.40 | 121 | 1.506 | 574 |

Examples 1 to 5, Comparative Examples 1 to 3

Resin compositions shown in Table 2 were prepared by the following procedure. Components in a ratio shown in Table 2 were weighed and uniformly mixed together, and the resulting mixture was injected into an extruder to prepare a resin composition. A vented double-screw extruder having a diameter of 15 mm (KZW15-25MG of Technobell Co., Ltd.) was used as an extruder. As for extrusion conditions, the delivery rate was set to 8.4 kg/h, the screw revolution was set to 250 rpm, the vent vacuum degree was set to 3 kPa and the extrusion temperature from the first feed port to the die was set to 220° C. so as to obtain a pellet. The obtained pellet was dried at 90° C. for 12 hours to evaluate its physical properties.

The raw materials used and shown in Table 2 are as follows.

(Component A)

A-1: copolycarbonate pellet produced in Reference Example 1

A-2: copolycarbonate pellet produced in Reference Example 2

A-3: copolycarbonate pellet produced in Reference Example 3

(Component B)

B-1: impact resistance modifier which is a core-shell rubber polymer consisting of a core composed of a rubber polymer comprising butadiene and butyl acrylate and a shell composed of methyl methacrylate and has an average particle diameter of 140 nm, a core glass transition temperature of −65° C. and a refractive index of 1.499

B-2: impact resistance modifier which is a core-shell rubber polymer consisting of a core composed of a rubber polymer comprising butadiene and a shell composed of methyl methacrylate and has an average particle diameter of 200 nm, a core glass transition temperature of −78° C. and a refractive index of 1.513

B-3: impact resistance modifier which is a core-shell rubber polymer consisting of a core composed of a rubber polymer comprising butyl acrylate and a shell composed of methyl methacrylate and has an average particle diameter of 300 nm, a core glass transition temperature of 0° C. and a refractive index of 1.488

B-4: impact resistance modifier which is a core-shell rubber polymer consisting of a core composed of a rubber polymer comprising butyl acrylate and a shell composed of methyl methacrylate and has an average particle diameter of 200 nm, a core glass transition temperature of 0° C. and a refractive index of 1.499

(Release Agent)

L-1: glycerin monostearate (Rikemal S-100A of Riken Vitamin Co., Ltd.)

(Stabilizer)

S-1: bis(2,6-di-tert-butyl-4-methylphenyl)pentaerythritol diphosphite (ADK STAB PEP-36 of ADEKA Corporation)

TABLE 2

| | | | R. Ex. | Ex. 1 | Ex. 2 | Ex. 5 | C. Ex. 1 | C. Ex. 2 | C. Ex. 3 | Ex. 3 | Ex. 4 |
|---|---|---|---|---|---|---|---|---|---|---|---|
| Component A | A-1 | pbw | | 100 | 100 | 100 | 100 | 100 | 100 | | |
| | A-2 | pbw | | | | | | | | 100 | |
| | A-3 | pbw | | | | | | | | | 100 |

TABLE 2-continued

| | | | R. Ex. | Ex. 1 | Ex. 2 | Ex. 5 | C. Ex. 1 | C. Ex. 2 | C. Ex. 3 | Ex. 3 | Ex. 4 |
|---|---|---|---|---|---|---|---|---|---|---|---|
| Component B | B-1 | pbw | | 5 | 10 | | | | | 10 | 10 |
| | B-2 | pbw | | | | | 10 | | | | |
| | B-3 | pbw | | | | | | 5 | 10 | | |
| | B-4 | pbw | | | | 10 | | | | | |
| Others | L-1 | pbw | 0.05 | 0.05 | 0.05 | 0.05 | 0.05 | 0.05 | 0.05 | 0.05 | 0.05 |
| | S-1 | pbw | 0.1 | 0.1 | 0.1 | 0.1 | 0.1 | 0.1 | 0.1 | 0.1 | 0.1 |
| Physical properties | Tensile breaking stress | MPa | | 48 | 46 | 44 | 46 | 50 | 50 | 55 | 59 |
| | Breaking nominal strain | % | | 21 | 28 | 22 | 56 | 67 | 48 | 28 | 33 |
| | Flexural strength | MPa | | 107 | 97 | 96 | 91 | 102 | 93 | 90 | 101 |
| | Flexural modulus | MPa | | 2800 | 2550 | 2530 | 2460 | 2820 | 2530 | 2272 | 2552 |
| | Deflection temperature under load | °C.(1.8 MPa) | | 84 | 84 | 84 | 88 | 87 | 84 | 101 | 110 |
| | Pencil hardness | — | | HB | HB | HB | HB | F | HB | B | HB |
| Total light transmittance | | % | | 92.2 | 92.0 | 88.7 | 75.6 | 86.1 | 80.2 | 91.0 | 88.2 |
| Haze | | % | | 1.1 | 1.1 | 3.3 | 22.2 | 6.2 | 13.2 | 2.2 | 3.4 |
| Average size | | nm | | 138 | 138 | 197 | 214 | 256 | 304 | 142 | 145 |
| Normalized dispersity | | % | | 14.9 | 15.2 | 15.2 | 15.5 | 17.2 | 17.5 | 15.4 | 16.1 |
| Notched Charpy impact strength | | KJ/m² | | 13 | 118 | 70 | 107 | 16 | 96 | 120 | 102 |
| Low-temperature (−30° C.) surface impact | | ductility | | ○ | ○ | x | ○ | x | x | ○ | ○ |

R. Ex.: Referece Example
Ex. Example
C. Ex.: Comparative Example
Pbw: part(s) by weight

EFFECT OF THE INVENTION

Since the resin composition of the present invention comprises an impact resistance modifier which forms a specific aggregation structure in a polycarbonate derived from a plant such as isosorbide, it has excellent impact resistance, desirably improved impact resistance at a low temperature, while it retains the transparency and surface hardness of the plant-derived polycarbonate.

INDUSTRIAL APPLICABILITY

Since a molded article obtained from the resin composition of the present invention has excellent transparency and surface hardness and further high impact resistance, it can be used in a wide variety of fields such as optical parts, mechanical parts, construction materials, auto parts, electric and electronic parts, exterior parts for various equipment, resin trays and dinnerware.

The invention claimed is:
1. A resin composition comprising;
(A) 100 parts by weight of a polycarbonate (component A) containing not less than 30 mol % of a recurring unit represented by the following formula (1)

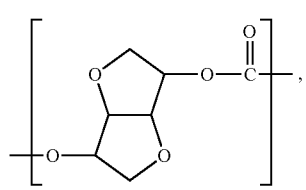

and (B) 2 to 20 parts by weight of an impact resistance modifier (component B), wherein the resin composition has an aggregation structure such that the impact resistance modifier (component B) domains are dispersed in the matrix of the polycarbonate (component A), wherein the average size of the impact resistance modifier (component B) domains is 5 to 200 nm and the normalized dispersity is not more than 17%, and wherein the impact resistance modifier (component B) satisfies the following conditions (a) to (e):

(a) the impact resistance modifier is a core-shell type polymer;

(b) the core is composed of a rubbery polymer of a vinyl-based monomer or a rubbery polymer of a diene-based monomer and a vinyl-based monomer, wherein the vinyl-based monomer is at least one selected from the group consisting of (meth)acrylic acid monomers and (meth)acrylic acid alkyl ester monomers;

(c) the shell is composed of a polymer of at least one vinyl-based monomer;

(d) the average particle diameter of the core-shell type polymer is 50 to 200 nm; and (e) the refractive index of the impact resistance modifier is 1.490 to 1.510.

2. The resin composition according to claim 1, wherein the difference between the refractive index of the impact resistance modifier (component B) and the refractive index of the polycarbonate (component A) is not more than 0.010.

3. The resin composition according to claim 1, wherein the glass transition temperature of the core of the impact resistance modifier (component B) is 0° C. or lower.

4. The resin composition according to claim 1, wherein the polycarbonate (component A) contains a structural unit derived from an aliphatic dihydroxy compound and has a melt viscosity measured by a capillary rheometer at 240° C. of $0.01 \times 10^3$ to $1.10 \times 10^3$ Pa·s at a shear rate of 6,080 sec$^{-1}$ and a glass transition temperature (Tg) of 60 to 165° C.

5. The resin composition according to claim 1, wherein the total light transmittance of a molded plate thereof having a thickness is 3 mm is not less than 88%.

6. The resin composition according to claim 1, wherein the haze of a molded plate thereof having a thickness of 3 mm is not more than 10%.

7. A molded article formed from the resin composition of claim 1.

8. An impact resistance modifier for polycarbonates which comprises not less than 30 mol % of a recurring unit represented by the following formula (1)

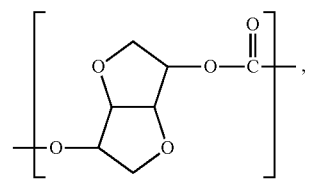

and satisfies the following conditions (a) to (e):
(a) the impact resistance modifier is a core-shell type polymer;
(b) the core is composed of a rubbery polymer of a vinyl-based monomer or a rubbery polymer of a diene-based monomer and a vinyl-based monomer, wherein the vinyl-based monomer is at least one selected from the group consisting of (meth)acrylic acid monomers and (meth)acrylic acid alkyl ester monomers;
(c) the shell is composed of a polymer of at least one vinyl-based monomer;
(d) the average particle diameter of the core-shell type polymer is 50 to 200 nm; and
(e) the refractive index of the impact resistance modifier is 1.490 to 1.510.

* * * * *